Nov. 14, 1961  E. J. HARDGRAVE, JR  3,008,291
SUBSONIC-SUPERSONIC STREAMLINED LEADING EDGE OR COWL LIP
Filed Oct. 20, 1954
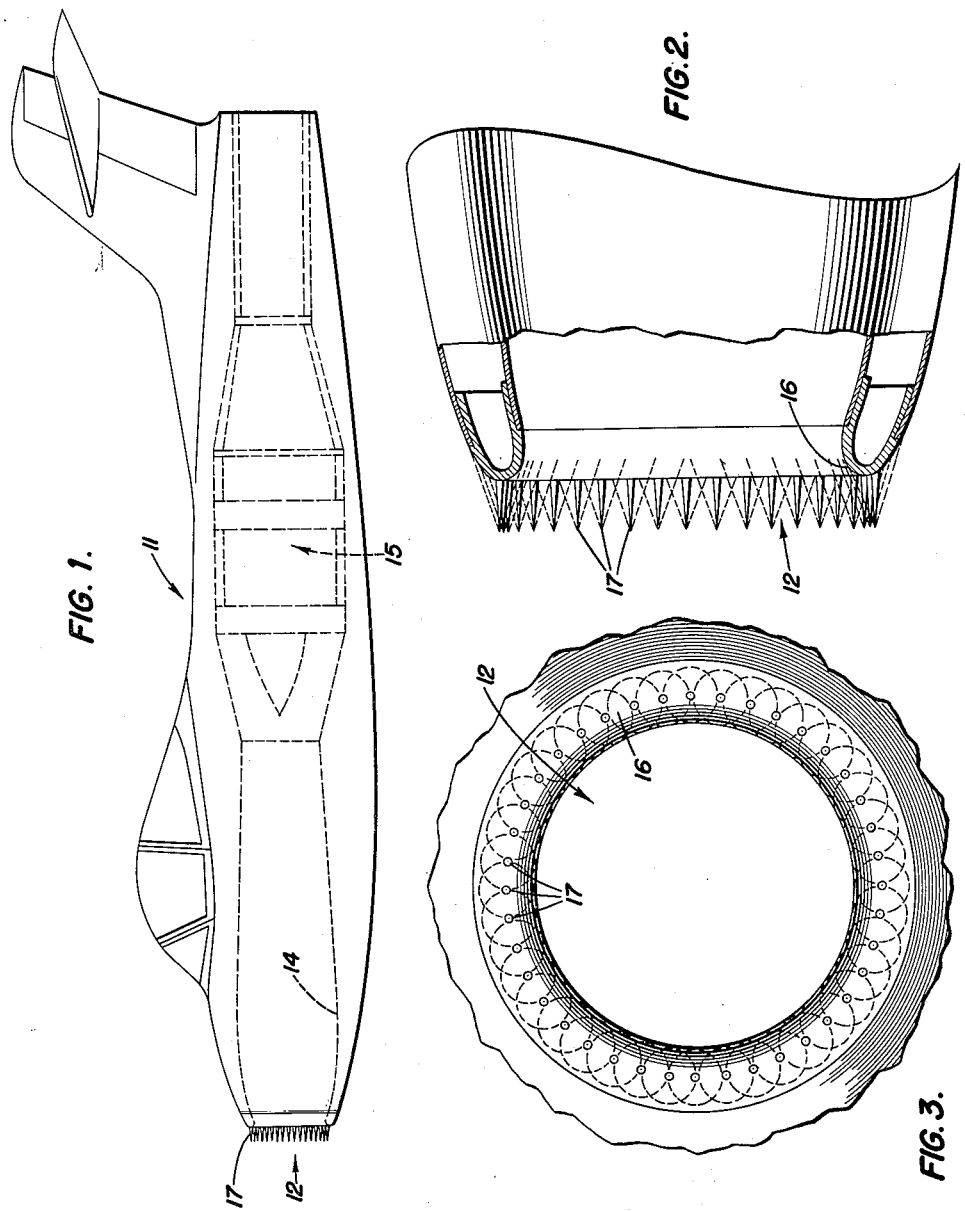
INVENTOR
EVERETT J. HARGRAVE, JR.

United States Patent Office 3,008,291
Patented Nov. 14, 1961

3,008,291
SUBSONIC-SUPERSONIC STREAMLINED LEADING EDGE OR COWL LIP
Everett J. Hardgrave, Jr., Silver Spring, Md., assignor to the United States of America as represented by the Secretary of the Navy
Filed Oct. 20, 1954, Ser. No. 463,634
4 Claims. (Cl. 60—35.6)

The present invention relates to air inlets for engines, and particularly to air inlet configurations for engines designed to accelerate aerial vehicles from subsonic to supersonic speeds. The invention is illustrated in conjunction with a turbojet engine, although it is to be understood that the invention is not limited in application thereto but can most readily be adapted for use with other types of engines.

Heretofore, air inlet configurations for subsonic jet engines differed radically from those designed for supersonic jet engines, for reasons well appreciated in view of the difference in flow characteristics of supersonic and subsonic streams.

It has been customary to design air inlets for operation in the subsonic speed zone with rounded lips. This type of construction permits a smooth, streamlined flow of air from the atmosphere adjacent the inlet over the lip and into said inlet, with minimum pressure loss.

However, under supersonic operating conditions the air inlet receives its air in what may be called a "cookie cutter" fashion, wherein only the air directly confronting the inlet is received. A rounded lip therefore is not required for an air inlet designed for supersonic operation. Moreover, a rounded lip, because of its blunt frontal area, incurs larger drag forces at supersonic speeds and is undesirable from that standpoint.

For operation at supersonic speeds the air inlet was customarily provided with a sharp lip so that a segment of air was cleanly cut from the airstream and drag forces were reduced. However, such a sharp lip prevents the smooth, streamlined flow thereover as needed under subsonic conditions and therefore incurs excessive pressure loss for subsonic operation.

Because the prior, basic air inlet configurations of turbojet engines differed for operation in the subsonic and the supersonic speed ranges, a prior art engine designed to accelerate vehicles from a standstill to a speed in the subsonic range, e.g. in taking off, could not operate efficiently upon reaching the supersonic speed range. Conversely, an engine designed to operate in the supersonic range could not efficiently provide acceleration from a standstill to speeds within the subsonic and transsonic ranges, and thence upward to a supersonic speed.

It is, therefore, the principal object of this invention to provide an air inlet for an engine which will enable said engine to accelerate from a standstill through the subsonic and transsonic speed zones to a supersonic speed.

It is a further object of the present invention to provide an air inlet for an engine which is capable of efficient operation both in the subsonic and the supersonic speed ranges.

Further objects and attendant advantages of this invention will become evident from the following detailed description taken in conjunction with the accompanying drawings, in which:

FIG. 1 is a side elevation of an aerial vehicle employing a turbojet engine having an air inlet embodying the present invention;

FIG. 2 is an enlarged section, partly in elevation, of the forward portion of the engine shown in FIG. 1, particularly illustrating the air inlet embodying the present invention; and FIG. 3 is a front elevation of the air inlet shown in FIG. 2.

In accordance with the invention, an engine is provided with an air inlet arrangement capable of subsonic and supersonic operation. This inlet arrangement comprises a rounded lip for permitting the smooth flow of air into the inlet opening from the atmosphere at the sides of the inlet at subsonic speeds, and a plurality of spikes mounted in spaced relation and in the direction of travel of the lip to cause the formation of overlapping cones of relatively dead air and to present a sharp, streamlined leading surface in front of said rounded lip at supersonic speeds.

Referring to the drawing, there is shown in FIG. 1 an aerial vehicle 11 including a turbojet engine having an air inlet 12 and a duct 14 for conducting air from said inlet 12 to the compressor, burners and turbine all generally indicated by reference numeral 15, located behind said inlet 12.

FIGS. 2 and 3 illustrate the inlet 12 in detail as having a rounded lip 16 which is of the ordinary type employed in turbojet engines designed for subsonic operation. Mounted on the frontal areas of the lip 16 and substantially parallel to the axis of the duct 14 are a plurality of thin pointed spikes 17 arranged in an annular spaced series. The length of the spikes 17 and the distance therebetween depend upon the dimensions and roundness of the lip 16 and will be clearly understood after a description of the operation of the inlet 12.

In the operation of the inlet 12 at subsonic speeds, air from the atmosphere confronting and on all sides of the inlet 12 is sucked through the inlet into the duct 14 by the compressor of the turbojet engine. Because of the contour of the rounded lip 16, air from the atmosphere at the sides of the inlet 12 flows smoothly over said lip between the spikes 17 with a minimum of interference.

When the engine accelerates to supersonic speeds, the boundary layers on the spikes 17 separate and form cones of relatively "dead" air about the spikes 17. The "dead" air cones have half angles of approximately nineteen degrees which remain substantially constant over a wide range of Mach numbers and their apexes are attached to the tips of the spikes 17.

The length of the spikes 17 is determined by the tangency of the "dead" air cones with the inner and outer peripheral surfaces of the lip 16. The spacing of the spikes 17 is such that the base areas of adjacent "dead" air cones overlap to present a sharp serrated leading surface in front of the rounded lip 16.

In effect, the overlapping "dead" air cones modify the actual configuration of the inlet 12 from a subsonic type to a supersonic type when an engine employing the inlet attains supersonic speeds. The large drag forces normally to be expected from the blunt frontal area of the lip 16 are averted by the formation of the overlapping "dead" air cones, and the inlet 12 is therefore capable of efficient supersonic operation as well as efficient subsonic operation.

Obviously, many modifications and variations of the present invention are possible in the light of the above teachings. It is, therefore, to be understood that within the scope of the appended claims the invention may be practiced otherwise than as specifically described.

What is claimed is:
1. An air inlet arrangement for an engine capable of efficient subsonic as well as supersonic operation, said inlet arrangement comprising, annular structure having a lip defining an inlet for permitting the smooth flow of air into said inlet from the atmosphere at the sides of the inlet at subsonic speeds, and a plurality of spikes mounted on said lip in spaced relation and in the direction of travel of the lip to cause the formation of over- lapping cones of relatively dead air and to present a sharp, streamlined leading surface in front of said lip at supersonic speeds of the airflow.

2. A jet inlet arrangement for an engine capable of efficient subsonic as well as supersonic operation, said inlet arrangement comprising, structure having an annular opening with a lip defining an inlet for permitting smooth flow of air into said inlet from the atmosphere at the sides of the inlet at subsonic speeds, and means mounted on said lip in the direction of travel of said lip to cause the formation of overlapping cones of relatively dead air and to present a sharp, streamlined leading surface in front of said lip at supersonic speeds of the airflow.

3. An air inlet arrangement for a turbojet engine capable of efficient subsonic as well as supersonic operation, said inlet arrangement comprising, a rounded lip structure defining an inlet for permitting the smooth flow of air into said inlet from the atmosphere at the sides of said inlet at subsonic speeds, and a plurality of spike means mounted on said rounded lip in parallel, spaced relation and in the direction of travel of said lip to cause the formation of overlapping cones of relatively dead air and to present a sharp, streamlined leading surface in front of said rounded lip at supersonic speeds of said air.

4. A turbojet engine air inlet arrangement capable of efficient subsonic as well as supersonic operation, said inlet comprising, structure having an opening therein, the structure surrounding said opening having a rounded lip for permitting the smooth flow of air into opening from the atmosphere at the sides of the inlet at subsonic speeds, and a plurality of pointed members mounted on said rounded lip in parallel, spaced relation and in the direction of travel of the lip to cause the formation of overlapping cones of relatively dead air and to present a sharp, streamlined leading surface in front of said rounded lip at supersonic speeds.

References Cited in the file of this patent
UNITED STATES PATENTS

| | | |
|---|---|---|
| 2,632,295 | Price | Mar. 24, 1953 |
| 2,727,706 | Heilig | Dec. 20, 1955 |
| 2,780,913 | Nicks | Feb. 12, 1957 |
| 2,864,236 | Touré | Dec. 16, 1958 |